(12) United States Patent
Sewell et al.

(10) Patent No.: US 11,995,645 B2
(45) Date of Patent: May 28, 2024

(54) COMPUTER-IMPLEMENTED SYSTEM AND METHOD FOR GENERATING AND EXTRACTING USER RELATED DATA STORED ON A BLOCKCHAIN

(71) Applicant: nChain Licensing AG, Zug (CH)

(72) Inventors: Martin Sewell, London (GB); Vera Vsevolozhsky, London (GB); Craig Steven Wright, London (GB)

(73) Assignee: nChain Licensing AG, Zug (CH)

(*) Notice: Subject to any disclaimer, the term of this patent is extended or adjusted under 35 U.S.C. 154(b) by 144 days.

(21) Appl. No.: 17/674,300

(22) Filed: Feb. 17, 2022

(65) Prior Publication Data

US 2022/0245626 A1  Aug. 4, 2022

Related U.S. Application Data

(63) Continuation of application No. 16/482,689, filed as application No. PCT/IB2018/050517 on Jan. 29, 2018, now Pat. No. 11,257,070.

(30) Foreign Application Priority Data

Jan. 31, 2017  (GB) ..................................... 1701605
Jan. 31, 2017  (GB) ..................................... 1701608

(51) Int. Cl.
*G06Q 20/36*  (2012.01)
*G06F 16/182*  (2019.01)
(Continued)

(52) U.S. Cl.
CPC ..... *G06Q 20/3678* (2013.01); *G06F 16/1837* (2019.01); *G06Q 20/0658* (2013.01);
(Continued)

(58) Field of Classification Search
CPC ........... G06Q 20/3678; G06Q 20/0658; G06Q 20/3827; G06Q 20/3829; G06Q 20/389;
(Continued)

(56) References Cited

U.S. PATENT DOCUMENTS 10,404,450 B2 *  9/2019  Wood ................... H04L 63/062
2006/0149745 A1  7/2006  Mengerink
(Continued)

FOREIGN PATENT DOCUMENTS

CN  106230808 A  12/2016
CN  106296390 A  1/2017
(Continued)

OTHER PUBLICATIONS

Gkasdrogkas "An Example-Based Introduction to Finite-State Machines", retrieved from https://levelup.gitconnected.com/an-example-based-introduction-to-finite-state-machines-f908858e450f, Feb. 7, 2020, 34 pages (Year: 2020).*
(Continued)

*Primary Examiner* — James D Nigh
(74) *Attorney, Agent, or Firm* — Davis Wright Tremaine LLP

(57) ABSTRACT

A computer implemented system and a method for providing user related data, such as reputational information, on users of a blockchain involved in transactions is detailed. The method includes an approach for evaluating fulfilment of transactions, particularly in the context of contracts, and then providing a record of that on the blockchain through reputational information. As a result, at a late time, this reputational information can be retrieved. Similar reputational information for other transactions can be retrieved and linked to the same user, for instance based on the use of a hash of the master public key for a user. Aggregate reputa-
(Continued)

tional information can be computed from the pieces of reputational information retrieved.

12 Claims, 3 Drawing Sheets

(51) Int. Cl.
*G06Q 20/06* (2012.01)
*G06Q 20/38* (2012.01)
*H04L 9/06* (2006.01)
*G06Q 20/32* (2012.01)

(52) U.S. Cl.
CPC ..... *G06Q 20/3827* (2013.01); *G06Q 20/3829* (2013.01); *G06Q 20/389* (2013.01); *H04L 9/0637* (2013.01)

(58) Field of Classification Search
CPC  G06Q 20/322; G06Q 20/065; G06F 16/1837; H04L 9/0637
USPC .......................................................... 705/69
See application file for complete search history.

(56) References Cited

U.S. PATENT DOCUMENTS

| | | | | |
|---|---|---|---|---|
| 2015/0302400 | A1* | 10/2015 | Metral | G06Q 40/12 705/75 |
| 2015/0324764 | A1* | 11/2015 | Van Rooyen | G06Q 20/02 705/69 |
| 2016/0071108 | A1 | 3/2016 | Caldera et al. | |
| 2016/0162897 | A1 | 6/2016 | Feeney | |
| 2016/0203575 | A1 | 7/2016 | Madhu et al. | |
| 2016/0335533 | A1 | 11/2016 | Davis et al. | |
| 2017/0024813 | A1 | 1/2017 | Crouspeyre et al. | |
| 2017/0048235 | A1* | 2/2017 | Lohe | G06Q 50/01 |
| 2018/0101842 | A1* | 4/2018 | Ventura | G06Q 10/087 |
| 2018/0144153 | A1* | 5/2018 | Pead | H04L 63/102 |
| 2018/0189753 | A1* | 7/2018 | Konda | H04L 9/14 |
| 2019/0013943 | A1* | 1/2019 | Maim | H04L 9/3247 |
| 2019/0279197 | A1* | 9/2019 | Wright | G06F 9/4498 |
| 2019/0354725 | A1* | 11/2019 | Lowagie | G06F 21/602 |

FOREIGN PATENT DOCUMENTS

| | | |
|---|---|---|
| KR | 101590076 B1 | 2/2016 |
| KR | 101661930 B1 | 10/2016 |
| WO | 2015085393 A1 | 6/2015 |

OTHER PUBLICATIONS

Liang et al. "Searchable Attribute-Based Mechanism With Efficient Data Sharing for Secure Cloud Storage", IEEE Transactions on Information Forensics and Security, vol. 10., No. 9, Sep. 2015, pp. 1981-1992 (Year: 2015).*
Dennis et al., "Rep on the block: A next generation reputation system based on the blockchain," 10th International Conference for Internet Technology and Secured Transactions (ICITST), Dec. 14, 2015, 8 pages.
Gkasdrogkas, "An Example-Based Introduction to Finite-State Machines," Medium, https://levelup.gitconnected.com/ an-example-based-introduction-to-finite-state-machines-f908858e450f, Feb. 7, 2020, 23 pages.
International Search Report and Written Opinion dated Apr. 3, 2018, Patent Application No. PCT/IB2018/050517, 15 pages.
Pacia et al., "OpenBazaar—Ratings, Reviews, and Reputation," Jul. 9, 2015, http://www.slideshare.net/drwasho/openbazaar-ratings-reviews-and-reputation?from_m_app=android, 82 pages.
Sharples et al., "The Blockchain and Kudos: A Distributed System for Educational Record, Reputation and Reward," ECCV 2016 Conference, Sep. 7, 2016, 8 pages.
UK Commercial Search Report dated Mar. 2, 2017, Patent Application No. GB1701608.0, 7 pages.
UK IPO Search Report dated Jul. 3, 2017, Patent Application No. GB1701608.0, 6 pages.
Wuille, "Hierarchical Deterministic Wallets," Github, https://github.com/bitcoin/bips/blob/ab90b5289f0356282397fa9b8aa47d2238a7b380/bip-0032.mediawiki, Feb. 12, 2016 (retrieved Mar. 23, 2017), 9 pages.
Zheng et al., "Blockchain Challenges and Opportunities: A Survey," International Journal of Web and Grid Services 14(4):352-75, Oct. 17, 2018 (first disclosed 2016).
Nakamoto, "Bitcoin: A Peer-to-Peer Electronic Cash System," Bitcoin, Oct. 31, 2008, https://bitcoin.org/bitcoin.pdf, 9 pages.
Satoshi et al., "Connection Limits," Bitcoin Forum, Aug. 9, 2010, https://bitcointalk.org/index.php?topic=741.0;prev_next=prev, 2 pages.
Antonopoulos, "Mastering Bitcoin—Unlocking Digital Cryptocurrencies," O'Reilly Media, Inc., Dec. 20, 2014, 282 pages.
Dennis et al., "Rep on the Block: A Next Generation Reputation System Based on the Block", The 10th International Conference for Internet Technology and Secured Transactions, IEEE, 2015, 8 pages.
Sharples et al., "The Blockchain and Kudos: A Distributed System for Education Record, Reputation and Reward", European Conference on Technology Enhanced Learning, Sep. 2016, 7 pages.

* cited by examiner

| Version number | |
|---|---|
| Number of inputs | 1 |
| Input (unlocking) | Previous transaction | Hash | $T_0$ |
| | | Output Index | |
| | Length of signature script | |
| | Signature Script [P2PKH] | <DFA's signature> <DFA's public key> |
| | Sequence number | |
| Number of outputs | 1 |
| Output (locking) | Value | dust |
| | Length of public key script | |
| | Public key script [P2SH multisig] | OP_HASH160 <hash160(redeem script)> OP_EQUAL |
| Locktime | 0 |

Fig. 1

| Redeem script [P2SH multisig] | OP_1 <transaction type> <hash(master public key)> <DFA state-zero or one> <DFA public key> OP_4 OP_CHECKMULTISIG |
|---|---|

Fig. 2

| P2PKH | | | | $T_0$ | <DFA's signature> <DFA's public key> |
|---|---|---|---|---|---|
| P2SH multisig | $T_1$ | OP_HASH160 <hash160(redeem script)> OP_EQUAL | OP_1 <transaction type> <hash(master public key)> <DFA state (0 or 1)> <DFA public key> OP_4 OP_CHECKMULTISIG | | |

Fig. 3

COMPUTER-IMPLEMENTED SYSTEM AND METHOD FOR GENERATING AND EXTRACTING USER RELATED DATA STORED ON A BLOCKCHAIN

CROSS-REFERENCE TO RELATED APPLICATIONS

This application is a continuation of U.S. patent application Ser. No. 16/482,689, filed Jul. 31, 2019, entitled "COMPUTER-IMPLEMENTED SYSTEM AND METHOD FOR GENERATING AND EXTRACTING USER RELATED DATA STORED ON A BLOCKCHAIN," which is a 371 National Stage of International Patent Application No. PCT/IB2018/050517, filed Jan. 29, 2018, entitled, "COMPUTER-IMPLEMENTED SYSTEM AND METHOD FOR GENERATING AND EXTRACTING USER RELATED DATA STORED ON A BLOCKCHAIN," which claims priority to United Kingdom Patent Application No. GB1701608.0, filed Jan. 31, 2017, entitled "COMPUTER-IMPLEMENTED SYSTEM AND METHOD," and United Kingdom Patent Application No. GB1701605.6, filed Jan. 31, 2017, entitled "COMPUTER-IMPLEMENTED SYSTEM AND METHOD," the disclosures of which are incorporated herein by reference in their entirety.

FIELD OF INVENTION

This invention relates generally to computer implemented system and a method, and more particularly to a computer implemented system and method for providing data on users involved in transactions. The invention is particularly suited, but not limited to, use in providing data, such as scores, accuracy or quality measures in relation to aspects of transactions on a blockchain. Examples include providing reputational information on users involved in transactions and particularly, but not limited to, providing reputational information on users of smart contracts implemented on the blockchain.

BACKGROUND OF INVENTION

In this document we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token which has no discernable meaning or value. The token thus serves as an identifier that allows the real-world item to be referenced from the blockchain.

Various prior art methodologies are known for managing user related data, such as reputational data or credit information, within a network. Examples of such prior art methodologies are briefly described below.

A presentation by Chris Pacia et al. entitled "OpenBazaar—Ratings, reviews and reputation" discloses a blockchain based ratings system. On slide 55 it is indicated that once an item is received, a Buyer creates a rating just before releasing funds to a Vendor. The rating data is attached to a Ricardian contract. The ratings data comprises scores provided by the Buyer based on the following parameters: feedback; quality; description; delivery time; customer service; and review. On slide 63 it is indicated that OP RETURN has the Vendor's Globally Unique Identifier (GUID) embedded, which is used to filter relevant multisignature transactions from the blockchain when scanning for ratings. It is further indicated that of these tagged multisignature transactions, only those with the Vendor's GUID signature within the scriptsig are considered valid, "as it is unforgeable evidence that the Vendor was involved in the transaction".

It has been noted that in the system disclosed in OpenBazaar, the ratings data is provided by a user (the Buyer). This ratings information can in principle be abused (e.g. by a competitor entering poor ratings information). To prevent abuse of the ratings system in OpenBazaar, the system only use transactions which have been signed off by a Vendor, thus representing real transactions. However, this would not prevent a competitor from legitimately buying goods or services in transactions signed off by a Vendor but then providing poor ratings information in an attempt to dissuade others from buying goods or services from the Vendor.

WO 2015/085393 discloses a rating system for rating a transaction history of a digital currency. The rating system comprises: a storage system for storing transaction information of the digital currency; an interface for receiving an identifier of at least one account associated with the digital currency and a request for rating the transaction history of the at least one account; and a processor communicative with the storage system and the interface. The processor identifies transactions of the at least one account from the transaction information stored in the storage system and assesses the destination of the identified transactions to generate a rating for the at least one account. It is further disclosed that the rating system may assess the amount and age of the identified transactions and that the rating system may be useful, for example, for peer-to-peer digital currencies. The storage system does not appear to include the blockchain and also user specific transactions merely include the amount, date, and destination of the identified transactions.

US 2006149745 discloses a system and method to provide feedback data within a distributed feedback system of an e-commerce system. Feedback data describing e-commerce transactions are generated by buyers of goods and services and the corresponding sellers of these goods and services. The feedback data is stored and maintained within a set of feedback servers organized into a peer-to-peer (P2P) network of distributed devices. The feedback data is organized into groupings of feedback data that are stored onto database storage associated with each of the P2P network nodes. Buyers and sellers may search the feedback data from these distributed data sources to obtain reputation data associated with parties with which they propose to enter into new transactions for goods and services. No blockchain system is disclosed to which the user related data is sent, stored, searched, and extracted.

US 2015302400 discloses distributed crypto currency reputation systems and methods include monitoring a crypto currency public ledger. A current crypto currency transaction is detected in the crypto currency public ledger and, in response, reputation markers may be allocated to both a payer and a payee that are involved in the current crypto currency transaction. At least some of the reputation markers are then determined to have been transferred from the payer to the payee and from the payee to the payer. When a request for reputation information for the payee or the payer is received, information associated with the transfer of the at least some of the reputation markers from the payer to the payee or from the payee to the payer may then be provided.

CN 106230808 discloses storing personal credit information from many different institutions on a blockchain.

SUMMARY OF INVENTION

An issue with existing systems and methods for providing data, such as reputational information, on users of systems is that the systems and hence the data are susceptible to attack and manipulation or are unsuited to implementation in a distributed system.

Thus, it is desirable to provide a solution which includes amongst its aim a system and/or method which is more robust against attack or manipulation.

Thus, it is desirable to provide a solution which includes amongst its aim a system and/or method which is more suited to implementation in a distributed system.

Thus, it is desirable to provide a solution which includes amongst its aim a system and/or method which is suited to use in a blockchain or Bitcoin blockchain type implementation.

It is further desired to provide a solution which is more objective in terms of generating user related information.

Yet a further aim is to provide an effective and efficient method of generating, storing, and searching user related data on a blockchain.

Such an improved system has now been devised. The present invention is defined in the appended claims and/or the statements of invention and/or in the features, options and possibilities set out within this document.

According to a first aspect of the present invention there is provided a method of computing aggregated user related data, the method comprising:

a. constructing a user related data transaction, the user related data transaction including an expression of user related data from a prior transaction involving a user;
b. broadcasting the user related data transaction to the blockchain;
c. repeating steps a) and b) for multiple prior transactions and/or multiple users.
d. selecting a user for which aggregated user related data is required, to give a selected user;
e. generating a filter related to a selected user;
f. searching the blockchain for user related data transactions to which the filter applies;
g. computing aggregated user related data for the selected user from the reputational transactions to which the filter applies.

The method may provide that the aggregated user related data is aggregated reputational information. The user related data transaction may be a reputation transaction. The user related data transaction may include an expression of the fulfilment of a prior transaction involving a user. The user related data from a prior transaction may be an expression of the fulfilment of the prior transaction involving the user.

The method may provide that the computed aggregated user related data is evaluated, preferably with the evaluation giving rise to a decision, most preferably with the decision giving rise to an action and/or a modification being made. One or more evaluations may be made. One or more decisions may arise. One or more actions may be taken. One or more modifications may be made.

The computed aggregated user related data may be evaluated relative to a threshold and/or a range. A value to one side of the threshold may result in a first decision. A value to a second side of the threshold may result in a second decision, preferably different to the first decision. A value inside the range may result in a first decision. A value outside the range may result in a second decision.

A decision and/or an action and/or a modification may give rise to a change to one or more inputs to one or more further transactions, such as blockchain transactions. A decision and/or an action and/or a modification may give rise to a change to one or more outputs from one or more further transactions, such as blockchain transactions. A decision and/or an action and/or a modification may give rise to a change to a deterministic finite automaton (DFA), for instance a DFA which implements one or more further transactions.

A decision and/or action and/or modification may provide feedback to modify and/or optimise the DFA, for instance the performance of the DFA.

A decision and/or action and/or modification may provide feedback to modify and/or optimise the design and/or production and/or storage and/or distribution and/or consumption of services and/or goods.

A decision and/or action and/or modification may provide feedback to modify and/or optimise a process, for instance a process for the design and/or production and/or storage and/or distribution and/or consumption of services and/or goods.

A decision and/or action and/or modification may provide feedback to modify and/or optimise a contract, such as a smart contract.

The user related data may be a time. The time may be a time of occurrence of an event. The event may be a transaction or a state transition or the time of the completion of the blockchain transaction resulting from the DFA and/or the time of a change of state within the DFA as it implements the DFA operation.

The user related data may be an expression of accuracy and/or precision. The accuracy and/or precision could arise from measurements inputted to the DFA or used by the DFA or outputted by the DFA. The measurements may be of one or more physical parameters, such as a size, volume, shape, mass, area or other quantitative value. Accuracy and/or precision relative to the physical parameter, for instance a predetermined acceptable range may be evaluated and recorded. The evaluation may be relative to a true value and/or a deviation and/or an error relative to a target and/or true value. The evaluation may be the presence or absence of defects or other undesired features.

The user related data may concern a physical form. The physical form could relate to the physical forms that are inputted to the DFA or used by the DFA or outputted by the DFA, for instance a physical form itself and/or quantification of physical form such as a size, volume, shape, mass, area or other quantitative value. The user related data may be a type of good or service.

The user related data may concern quality, for instance of goods and/or services provided using the transaction, potentially a transaction implemented through the DFA. The quality may relate to the implementation of the transaction itself. The quality may be a specification quality and/or conformance quality. The quality may be used in a quality control process, for instance by providing feedback which influences one or more variables in a later transaction and/or a later form for the DFA and/or implementation by a DFA. The feedback may be on the presence or absence of one or more of: defects; issues; flaws; failed operations; failed state transitions. The quality may be used in a quality management process, for instance by providing feedback which influences the design and/or operation of a later transaction and/or a later form for the DFA and/or an implementation by a DFA. The quality management process may be a quality assurance process. The feedback may influence one or more of: the strength of the process and/or a process step; the stability of the process and/or a process step; the format of the process and/or a process step. The feedback may increase the extent to which the transaction is fit for purpose and/or right first time in a future configuration of the transaction.

The user related data may concern the capability of the user, for instance their capability to complete their parts of the transaction and/or the transaction generally, potentially implemented via a DFA. The capability may be a record of one or more of the following: evidence of competence; evidence of knowledge; evidence of skills; evidence of experience; evidence of qualifications; evidence of certification; and, in particular, evidence of an assessment of one or more of those. The capability may be one or more of: membership of an organisation and/or regulated body; endorsement and/or approval by a third party, such as a regulator or trade body; presence on a third party operated register.

In the context of contracts, potentially represented/implemented by a DFA, then the contracts may relate to a range of financial instruments. Potential financial instruments may include cash, evidence of ownership, contractual right to receive or deliver cash (such as bonds). Potential financial instruments may include cash instruments, potentially including one or more of: shares; securities; bonds; bills; stocks; options; futures; market valued assets. Potential financial instruments may include derivative instruments, potentially including one or more of: assets; indexes; interest rates; loans; deposits; certificates of deposit; spot rates; spot exchange rates.

A computer implemented system and a method for providing user related data, such as reputational information, on users of a blockchain involved in transactions is thus provided. The method includes an approach for evaluating fulfilment of transactions, particularly in the context of contracts, and then providing a record of that on the blockchain through reputational information. As a result, at a late time, this reputational information can be retrieved. Similar reputational information for other transactions can be retrieved and linked to the same user, for instance based on the use of a hash of the master public key for a user. Aggregate reputational information can be computed from the pieces of reputational information retrieved.

In a preferred embodiment, particularly in the context of contracts, the evaluation and record provision can be implemented using a deterministic finite automaton (DFA). The method provides that for each user involved in each smart contract, the DFA not only configures and allows for implementation of the smart contract, but also considers the extent of fulfilment of the smart contract's terms. Thus the DFA generates reputational information in relation to each user in each smart contract. In the derivatives example, this is in effect credit rating information. The DFA provides that this reputational information is published to and hence stored on the blockchain.

Thus, according to certain configurations, the user related data, such as ratings information, is generated by the system itself rather than by a user. One example of such an automated system is the use of a DFA as outlined above. However, in principle this could be implemented by any automated blockchain system where the system rather than the users provide the ratings data. For example, ratings data may be generated by a blockchain system according to how users meet terms when implementing a digital smart contract on a blockchain system. This methodology provides more objective data when compared to user inputted data and is generated and stored in a more efficient and reliable manner.

The method may further provide one or more of:
   a. defining a transaction between at least one user and at least one further user;
   b. implementing the transaction;

c. providing user related data from the transaction for, such as an expression of the fulfilment of the transaction by, at least one of the users or at least one of the further users, thereby providing a user related data expression, such as a user fulfilment expression;

for instance, thereby providing the user related data expression, such as a user fulfilment expression, for use in constructing a user related data transaction, such as a reputation transaction, the user related data transaction, such as the reputation transaction, including a user related data expression, such as an expression of the fulfilment of a prior transaction involving a user.

According to a second aspect of the invention there is provided a method of making a record of user related data, the method comprising:
a. defining a transaction between at least one user and at least one further user;
b. implementing the transaction;
c. providing user related data from the transaction for at least one of the users or at least one of the further users, thereby providing a user related data expression;
d. constructing a user related data transaction, the user related data transaction including the user related data expression;
e. broadcasting the user related data transaction to the blockchain.

The method may provide that the user related data is reputational information. The user related data from the transaction may be an expression of the fulfilment of the transaction involving the user. The user related data transaction may be a reputation transaction. The user related data transaction may include an expression of the fulfilment of a prior transaction involving a user. The user related data expression may be a user fulfilment expression.

The second aspect of the invention may include any of the features, options and possibilities set out in the first aspect of the invention.

According to a third aspect of the invention there is provided a method of computing aggregated user related data, the method including:
a. selecting a user for which aggregated user related data is required, to give a selected user;
b. generating a filter related to a selected user;
c. searching the blockchain for user related data transactions to which the filter applies;
d. computing aggregated user related data for the selected user from the user related data transactions to which the filter applies.

The method may provide that the aggregated user related data is aggregated reputational information. The user related data transaction may be a reputation transaction. The user related data transaction may include an expression of the fulfilment of a prior transaction involving a user. The user related data from a prior transaction may be an expression of the fulfilment of the prior transaction involving the user.

The third aspect of the invention may include any of the features, options and possibilities set out in the first aspect of the invention.

According to a fourth aspect of the present invention there is provided a computer implemented system arranged to implement the method of the first aspect of the invention, potentially including a system arranged to perform any of the features, options and possibilities set out elsewhere within this document.

The system may comprise of further comprise:
a. a user digital wallet;
b. at least one computing agent arranged to implement a DFA via a blockchain;
c. a blockchain platform.

The fourth aspect of the invention may include any of the features, options and possibilities set out in the first aspect of the invention.

According to a fifth aspect of the present invention there is provided a computer implemented system arranged to implement the method of the second aspect of the invention, potentially including a system arranged to perform any of the features, options and possibilities set out elsewhere within this document.

The system may comprise of further comprise:
a) at least one computing agent arranged to implement a DFA via a blockchain;
b) a blockchain platform.

The fifth aspect of the invention may include any of the features, options and possibilities set out in the first aspect of the invention.

According to a sixth aspect of the present invention there is provided a system, preferably a computer implemented system, arranged to implement the method of the third aspect of the invention, potentially including a system arranged to perform any of the features, options and possibilities set out elsewhere within this document.

The system may comprise of further comprise:
a) a user digital wallet;
b) at least one computing agent arranged to implement a DFA via a blockchain;
c) a blockchain platform.

The sixth aspect of the invention may include any of the features, options and possibilities set out in the first aspect of the invention.

Therefore, in accordance with the invention there may be provided or further provided options, possibilities and features from amongst the following.

The invention may further provide, particularly in relation to the first, second, fourth and fifth aspects of the invention, but also generally from amongst the following. The term reputational information may be substituted by the term user related data within the application. The reputation transaction may be substituted by the term user related data transaction within the application. The term expression of the fulfilment of the prior transaction may be substituted by the term expression of user related data.

The user fulfilment expression may be defined as a fulfilment score which quantifies the extent of fulfilment of the transaction by the user. The user fulfilment expression may reflect whether the transaction was completed. The user fulfilment expression may be a fulfilment value. The user fulfilment expression may a fulfilment score, for instance a binary score.

The reputation transaction further includes attributable information on the user to which the user fulfilment expression relates. The attributable information on the user may be an address, such as a Bitcoin address, for the user. The attributable information may be a signature script for the user or a hash thereof. The attributable information on the user may be an address, such as a Bitcoin address, for the user and/or the signature script for the user or a hash thereof. The attributable information may come from deterministic key generation performed for and/or on behalf of the user.

The reputation transaction may further include the transaction type for the transaction from which the user fulfilment expression was obtained. The transaction type may detail the content of the transaction. The transaction type may detail the transaction template used. The transaction type may be a contract type, for instance a smart contract type. The transaction type may be one of a known list of transaction types according to which transactions are typed.

The user fulfilment expression may be included in the metadata of the reputation transaction. The user fulfilment expression and/or the attributable information and/or the transaction type may be included in the metadata of the reputation transaction.

The reputation transaction may be a Pays To Script Hash (P2SH) transaction. The reputation transaction may be a multi-signature transaction. The reputation transaction may be addressed to an address controlled by a third party, for instance controlled by the DFA. The reputation transaction may send dust.

The reputation transaction may implement FIG. 1. The redeem script for the reputation transaction may implement FIG. 2.

The reputation transaction may be implemented by a deterministic finite automaton, DFA.

The method or system may include using a deterministic finite automaton, DFA, for one or more of: defining the transaction; implementing the transaction; providing the expression of the fulfilment; constructing a reputation transaction. The method or system may include using a common deterministic finite automaton, DFA, for defining the transaction, implementing the transaction, providing the expression of the fulfilment and constructing a reputation transaction.

The one or more transactions may be a contract, for instance a smart contract.

The invention may further provide, particularly in relation to the first, third and sixth aspects of the invention, but also generally from amongst the following.

The user may be selected from users offering a transaction. The user may be selected by a selecting user. Multiple users may be selected, for instance by a selecting user. The selecting user may be a user considering entering into one or more transactions.

The selection may be made using a user's digital wallet. The digital wallet may be provided with an interface for the selection of users. The digital wallet may be provided with an interface for the display of aggregate reputational information and/or further processed forms thereof.

Computing aggregated reputational information may be computed for one or more or all of the selected users.

The filter may be constructed by obtaining an address hash from the selected user and/or a signature script from the selected user. The filter may be constructed from the address hash arising from a public key of the selected user and/or from a signature script arising from a public key of the selected user. The filter may be constructed so as to provide a hash of the master public key of the selected user.

The method and/or system may further provide for the user accessing the blockchain and/or parsing the blockchain.

The method and/or system may further provide that reputation transactions in the blockchain are considered using the filter, preferably so as to collect all reputation transactions picked up by the filter, for instance to collect all reputation transactions including metadata picked up by the filter, most preferably to collect all reputation transactions picked up by the filter as relating to the master public key and all descendant public keys therefrom for a selected user.

The aggregate reputational information may have further processing applied, the further processing computing one or more of: a numerical reputation score; a reputation score; a reputational rating relative to other users.

The aggregate reputational information and/or a further processed form thereof may be computed: upon selection and/or just in time for the presentation of the score with the offer from the user and/or in advance of any selection and/or in advance of any transaction offer by a user.

The method of computing aggregated reputational information may provide a method further comprising presenting the aggregated reputational information to a user, particularly the user whose wallet computed the aggregated reputational information.

The method of computing aggregated reputational information may provide a method further comprising a user making a decision, the decision including consideration of the aggregated reputational information. The decision may include a decision to enter into a transaction with the selected user.

The method of computing aggregated reputational information may provide a method further comprising the user and/or the selected user undertaking an action. The action may include one or more of: providing information to the selected user; receiving information from the selected user; the selected user producing a product for the user; the user producing a product for the selected user; the selected user providing a product to the user; the user providing a product to the selected user; the selected user sending, dispatching or transporting a product to the user; the user sending, dispatching or transporting a product to the selected user. The product may be a service and/or goods.

BRIEF DESCRIPTION OF THE DRAWINGS

These and other aspects of the present invention will be apparent from and elucidated with reference to the embodiment described herein. An embodiment of the present invention will now be described, by way of example only, and with reference to the accompanying drawings, in which:

FIG. 1 shows the implementation of the Bitcoin transaction;

FIG. 2 shows the Bitcoin transaction redeem script related to the FIG. 1 Bitcoin transaction;

FIG. 3 shows the links between the transactions and the validation of the transactions.

DETAILED DESCRIPTION

Figure 4:
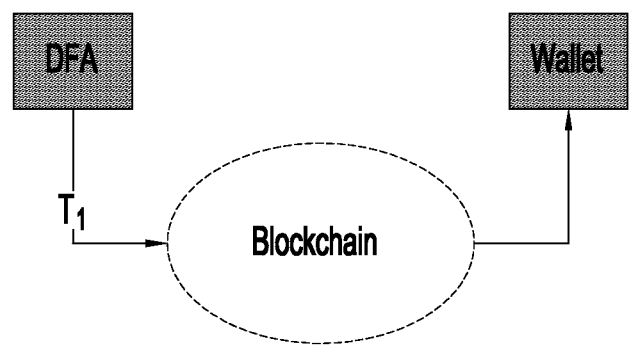
FIG. 4 shows the flow of information from a transaction to the blockchain and then to the wallet enquiring.

The proposed invention is an implementation of user related data recordal system on a blockchain, more specifically the Bitcoin blockchain, and user related data recovery and processing from the blockchain.

The method includes or provides an approach for user related data evaluation and then providing a record of that on the blockchain through a user related data record.

In a preferred embodiment, the evaluation and record provision can be implemented using a deterministic finite automaton (DFA). In the detailed example given below, this is exemplified in a particular embodiment featuring a peer-to-peer derivatives trading platform, but other contexts in which user related data is involved are equally possible.

The method provides that for each user involved in each transaction the DFA not only configures and allows for implementation of the transaction, but also considers the user related data arising from the transaction outcome, the state. Thus the DFA generates user related data in each transaction. The DFA provides that this user related data is published to and hence stored on the blockchain.

As a result, at a late time, this user related data can be retrieved. Furthermore, as explained below, similar user related data for other transactions can be retrieved and linked to the same user. In a preferred embodiment, this is based on the use of a hash of the master public key for a user. The aggregate user related data can be processed to give a user value for that user. The user value can then be used in subsequent evaluations and/or decisions and/or modifications.

In one embodiment, each user can employ their Bitcoin wallet to retrieve the user related data from the blockchain and then process the aggregate user related data, which can then be displayed to the user through the wallet interface. This provides useful information to the user, in effect a customer user, on the counterpart user, a vendor user, which helps the user decide whether to enter into the offered transaction or not, amongst other possible benefits.

The solution offered is robust, efficient, decentralised and pseudonymous.

The proposed invention offers the following potential benefits:
  distributed, so avoids a large single point of failure and is not vulnerable to attack;
  no fees (just a small transaction fee is usually expected under the Bitcoin protocol);
  global and can be participated in at any time by anyone with access to the Internet;
  transparent, once data has been written to the blockchain, anyone can see it;
  immutable, once data has been written to the blockchain, no one can change it; and
  a decentralised data recordal, storage and retrieval system.

Whilst the detailed implementation below is provided in the context of reputation being an important type of user related data, the invention is applicable to a wide variety of user related data.

The user related data arises as a result of the inputs (such as the user's presence and participation) to a blockchain transaction and as a result of the outputs (such as the user's impact upon the conduct and outcome) of the blockchain transaction. These allow the user related data to be processed, a user related data evaluation, to obtain the user related data worthy of recordal in the blockchain (in a user related data blockchain transaction). Thus those individual pieces of user related data are readily available in the blockchain for subsequent searching and collection to give aggregated user related data. This aggregated user related data can then be subjected to processing. The processing can give rise to various subsequent stages, including:
  the potential evaluation of the aggregate user related data; and/or
  one or more decisions based upon the aggregate user related data; and/or
  modification, for instance to a future blockchain transaction or a process variable, potentially one impacting upon a future blockchain transaction The decision and/or modification may potentially improve a future transaction and/or make that have a successful or more successful outcome compared with prior transactions.

In various embodiments, for instance, the user related data may concern a time. This could be the time of the completion of the blockchain transaction resulting from the DFA and/or the time of a change of state within the DFA as it implements the DFA operation. Multiple such times may come into existence from the DFA as it operates. The retrieval of multiple records of such user related data, including times, may be used to analyse (as the aggregate user related data) usage of the DFA and/or optimise the performance of the DFA, including the operation it is implementing. This could include optimising the timing of services or goods passing through the operation, for instance to improved process capacity. The optimisation could relate to people accessing a location or the like by causing changes in timing using control of variables in the operation. The time could inform on the reliability of the operation, when it is available, occasions on which maintenance or servicing had to be provided and the like.

In a various embodiments, for instance, the user related data may concern accuracy and/or precision. Thus user related data on the accuracy and/or precision of a user's contribution may be collected and recorded. The accuracy and/or precision could relate to measurements inputted to the DFA or used by the DFA or outputted by the DFA, for instance a physical parameter such as a size, volume, shape, mass, area or other quantitative value. Thus in the context of a DFA implementing a screening process which accepts or rejects the goods or services, the physical parameter may be considered. Accuracy or precision relative to the physical parameter, for instance a predetermined acceptable range may be evaluated and recorded. The evaluation may be relative to a true value, a deviation or error relative to a target or true value or the like. The evaluation may be the presence or absence of defects or other undesired features. Multiple such results can then be considered together (as the aggregate user related data) for instance to reveal reject rates for different processes and/or provide feedback to the control of those processes to improve them in the future.

In a various embodiments, for instance, the user related data may concern a physical form. Thus user related data on the physical form of a user's contribution may be collected and recorded. The physical form could relate to physical forms that are inputted to the DFA or used by the DFA or outputted by the DFA, for instance a physical form itself and/or quantification of physical form such as a size, volume, shape, mass, area or other quantitative value. Thus in the context of a DFA implementing a logistics operation, the physical form may be considered. Certain physical forms may then influence or control operations within the logistics operation, for instance a maximum mass (as the aggregate user related data) that can be handled in a unit and/or stock level of certain sizes. Similar principles can be applied to the user related data being a type of good or service. Hence, the user related data could reflect the outgoing sales of a type of good and the incoming replenishment supplies to give a stock level (as the aggregate user related data).

In a various embodiments, for instance, the user related data may concern the quality, for instance of goods and/or services provided using the transaction, potentially a transaction implemented through the DFA. The quality may relate to the implementation of the transaction itself. The quality may be a specification quality and/or conformance quality. The quality may be used in a quality control process, for instance by providing feedback which influences one or more variables in a later transaction and/or a later form for the DFA and/or implementation by a DFA. The feedback may be on the presence or absence of one or more of: defects; issues; flaws; failed operations; failed state transitions. The quality may be used in a quality management process, for instance by providing feedback which influences the design and/or operation of a later transaction and/or a later form for the DFA and/or an implementation by a DFA. The quality management process may be a quality assurance process. The feedback may influence one or more of: the strength of the process and/or a process step; the stability of the process and/or a process step; the format of the process and/or a process step. The feedback may increase the extent to which the transaction is fit for purpose and/or right first time in a future configuration of the transaction.

In a various embodiments, for instance, the user related data may concern the capability of the user, for instance their capability to complete their parts of the transaction and/or the transaction generally, potentially implemented via a DFA. The capability may be a record of one or more of the following: evidence of competence; evidence of knowledge; evidence of skills; evidence of experience; evidence of qualifications; evidence of certification; and, in particular, evidence of an assessment of one or more of those. The capability may be one or more of: membership of an organisation and/or regulated body; endorsement and/or approval by a third party, such as a regulator or trade body; presence on a third party operated register.

In the context of contracts, potentially represented/implemented by a DFA, then the contracts may relate to a range of financial instruments. Potential financial instruments may include cash, evidence of ownership, contractual right to receive or deliver cash (such as bonds). Potential financial instruments may include cash instruments, potentially including one or more of: shares; securities; bonds; bills; stocks; options; futures; market valued assets. Potential financial instruments may include derivative instruments, potentially including one or more of: assets; indexes; interest rates; loans; deposits; certificates of deposit; spot rates; spot exchange rates.

In the context of a reputation system: the user related data may be reputational information; and/or the user related data consideration may include evaluating fulfilment of transactions; and/or the transaction may be a contract; and/or the aggregate user related data may be aggregate reputational information; and/or the user value may be reputation representation or score.

In the context of reputation, there are various other situations in which benefit arises from the use of reputational information related to a public key. What the reputational information or score means depends upon the context. For example, it could be a score relating to playing an online game.

Reputational information, for instance a reputation score, may apply to hotels, restaurants, ecommerce sellers, contractors or peers. It may apply at the corporate, division, department or individual level. It may apply to all products (services or goods) of a user or just a set of such products or even an single product. For instance, with the right data, it would be possible to calculate the index of scientific research impact, the h-index.

Reputational information, for instance a reputation score, may be an integer or a real number. It may be weighted by recency. It may be an absolute rating or a ranking relative to peers.

As exemplified above, the principles of the invention are applicable to a wide variety of data relating to a user. The detailed implementation below is provided in the context of reputation being an important type of data, but the invention is similarly implemented for other data and so this embodiment is not limiting to the scope of the invention or its implementation.

Trust is the very foundation of many aspects of social and economic life. Trust is as vital a form of social capital as currency is a form of actual capital. However, how can you learn to trust someone you don't know but wish to transact with over the Internet?

A reputation system is a program that allows users to rate each other in online communities in order to quantify trust and encourage trustworthy behaviour through reputation.

Reputation systems are crucial for distributed applications in which users need to trust each other, such as e-commerce websites. Reputation measures how much a community trusts you, and is calculated based on your previous transactions and interactions within the community and/or other users in the ecosystem.

One facet of your reputation can be measured by your fulfilment of contracts entered into with other users, counterparts. The greater your reputation the more trustworthy you are seen to be on the network. This encourages interaction with you. Furthermore, with a user's reputation on the line, most users will choose to behave more honestly on the network.

A reputation system computes and publishes reputational information. The reputational information can take many forms, such as scores, a credit assessment, a credit score, a rating. That reputational information can be associated with a set of services.

Reputation has an excellent track record of facilitating cooperation in very diverse settings, for example online marketplaces like eBay or a blockchain-based auctions. It is therefore unsurprising that many peer-to-peer (P2P) systems have adopted some form of reputation scheme to reward good behaviour and/or punish bad behaviour by the peers.

There are issues, however, with the reliability of such reputation systems, their susceptibility to attack or manipulation and the breadth of situation in which they are available.

The particular embodiment described in this paper concerns P2P derivatives such as options, futures or forwards trading on the Bitcoin blockchain as a part of a P2P derivatives reputation ecosystem, In this particular embodiment, the DFA provides the reputational information to the blockchain, but the user's wallet generates the aggregate reputational information and then processes that into a quantified reputation, the measure of trust to put in the user.

The implementation of the invention is described by stepping through:
  the generation of transactions including the attributable information;
  the processing and recordal of the reputation transactions including the reputational information, together with the attributable information, on the blockchain;
  the extraction, for a selected user of their attributable information and as a consequence the reputational information for that selected user, by the customer user's wallet;
  the processing of the reputational information to give the aggregate reputational information and hence the quantified reputation by the customer user's wallet.

Vendor Wallet and Source of Attributable Information

In the example, based on derivatives, there may be a series of user's offering contracts which another user can chose, or not, to enter into. The user offering the contracts is designated a vendor user and the user choosing the contracts is designated a customer user for ease of identification. Of course both users may be offering and may be receiving within the terms of the contracts and the contracts may involve far more than two users and so these designations are not a limitation of the scope of the invention.

The vendor user has a wallet and the vendor user's wallet contains the information necessary to conduct transactions. This includes the public key and private key pair necessary for a transaction which in this case is a contract. As a piece of software, the vendor's digital wallet serves as a container for private keys and the provision of public keys, usually implemented as structured files or simple databases.

An increasingly common method for producing pairs of keys is deterministic key generation. These make it relatively easy to generate many keys from a single "seed". The production uses the seed to generate a master key. The master key can be used to generate a set of child keys with each child key being capable of generating a set of grandchild keys and so on through many generations. All of the keys are linked by the hierarchy. One only requires a single master key to generate the entire hierarchy of keys.

There are a number of advantages in using deterministic key generation and hierarchical deterministic key generation in particular, which encourage their adoption and use. Hence, the property they possess that the present invention builds on is present for a large proportion of keys in use.

Full details of an approach suitable for generating keys in this manner are available from the method described in the BIP0032 standard, see Wuille, P. (2012), *BIP 32: Hierarchical deterministic wallets*, GitHub.

DFA Implemented Transactions

As mentioned above, this embodiment concerns smart contracts, including their construction and performance by the users involved, together with the inventions role on reputational information. A deterministic finite automaton, DFA, represents one way in which it is possible to execute smart contracts for each user participating in a P2P derivatives trade over the Bitcoin blockchain.

Further details of the use of a DFA in the implementation of smart contracts is provided in the Use of a DFA in Smart Contracts section provided at the end of this document.

Whilst we have used a DFA in our example, because it is a useful tool for managing the state of a (financial) contract, we could add the functionality of the invention to a Bitcoin wallet without using a DFA.

A significant number of users may be involved in the contract structured and implemented using the DFA. Each of the users is associated with their pair of private and public keys which are used to facilitate the transaction. The previous section explains that these may be generated by a deterministic wallet and so relate back to a master key.

In the case of the vendor user, the seed will have been used to generate a master private key, the master private key used to generate a master public key and the master public key used to generate one or more generations of other public keys. The vendor user's wallet will select one of those other public keys to facilitate the transaction represented by the contract. As a recipient, the vendor user needs to provide a Bitcoin address.

The Bitcoin address is obtained by taking the other public key which is to be used and subjecting it to a cryptographic hashing algorithm to obtain a hash of the other public key. More specifically this is the computation of the SHA256 hash, followed by the computation of the RIPEMD160 hash. The resulting hash of the other public key will generally be encoded using Base58Check before actual use as the Bitcoin address for the other public key for use in the contract as a transaction.

Having constructed the contract, the implementation and outcome of the contract will occur with time. From the outcome, it may be seen that a user X, involved in the contract fulfilled the conditions imposed upon them by the contract or that the user X did not fulfil the conditions imposed upon them by the contract. As such contracts can be complex and involved multiple users, the outcome on the fulfilment may be seen for all those parties too.

In addition to the construction, implementation and outcome of the transaction, the DFA can also implement a further transaction to reflect the fulfilment position observed for a user in respect of that contract.

The fulfilment is reflected in a fulfilment value or preferably fulfilment score. In a preferred form this is a binary score for that contract for that user.

If there is fulfilment of the contract terms applicable to our vendor user, a score of 1 is generated. If fulfilment does not occur for at least one of the contract terms applicable to our vendor user, then a score of 0 is generated. The fulfilment, and more specifically in this embodiment the scores, can be determined by the DFA in parallel to the handling of the contract.

The DFA can also determine the transaction type, for instance from the specifics of the transaction or the transaction template used. In this specific example, the transaction is a contract, but the transaction type may be more specific than that for instance a P2P derivatives contract of a particular form might be used as the transaction type.

Finally, the DFA has of course been provided with the vendor user's Bitcoin address for the contract being implemented. This constitutes attributable information in the sense that it is linked to the vendor user; that is the nature of a Bitcoin address. In the alternative that the user is the paying user, the customer user, then the DFA will be provided with a public key or signature script which are also attributable information in the sense that they are linked to the customer user.

Given this transaction information, the method uses the DFA to conduct a further transaction, a reputation transaction. In the reputation transaction, the DFA provides that the metadata of the reputation transaction include within the metadata three pieces of metadata: the transaction type for the contract; the attributable information (for instance Bitcoin address or signature script) associated with that contract; and the fulfilment (for instance score) for that contract for the vendor user.

The DFA then creates the reputation transaction, which in this embodiment is a Bitcoin transaction, Ti, which includes this metadata, with a 1-of-4 P2SH multi-signature output, sending 'dust' (a negligible amount of bitcoins) from itself to an address also controlled by the DFA agent. FIG. 1 shows the implementation of the Bitcoin transaction. FIG. 2 shows the Bitcoin transaction redeem script. FIG. 3 shows the links between the various transactions. It can be seen that all transactions are standard P2PKH or P2SH multi-signature transactions and validate.

A major benefit of storing this reputation transaction, and hence the reputational information it contains on the blockchain is that the blockchain is immutable, which reduces the chances of an unfair rating attack. The reputation transaction is an intermediate form which is useful in its own right, but which also allows for the subsequent benefits of the invention.

In general it would not be possible for transactions broadcast prior to the adoption of the proposed invention to be considered by the DFA mechanism and used in the determination of reputational information from those transactions. However, every time a Bitcoin transaction is unlocked, the public key is exposed in the signature script, so a history of transactions associated with a particular public key will always be available.

Customer Wallet Use to Extract and Process

The embodiment now turns to the point of view of a customer user. The customer is interested in a P2P derivatives trade over the Bitcoin blockchain in this example. As such they may be offered a number of such trades from a number of users, including the vendor user discussed above in the example. The contracts offered may be the same or very similar in terms of their format, risk profile and pricing and other such variables between the different users offering a transaction.

Through the customer user's digital wallet, the customer user may be able to make one or more of a number of enquiries. These could relate to a particular user offering a trade or each of the users offering a trade of the same type. Using the example of an enquiry on a single user, our customer user is interested in the contract offered by our vendor user. Hence, the customer user may select that vendor user though a wallet function in the customer user's wallet to start an investigation of the vendor user's reputation.

The customer user's wallet is aware of the Bitcoin address of the vendor user offering the transaction as this is a part of the contract being offered. The Bitcoin address is a hash of the particular public key offered in that contract and hence related back to the master public key. As a result, it is possible for the customer user's wallet to determine the hash of the master public key of the vendor user, the master public key being behind that specific other public key. In this respect any hash function, such as SHA-256, may be used to hash the master public key.

The customer user's wallet can then access and parse the blockchain, searching for historical reputation transactions in the blockchain and filter those transaction by the hash of the master key obtained for the selected vendor user. Each of the reputation transactions in the blockchain using a descendant of the common master public key associated with that vendor user selected in the enquiry by the customer user would be found in this way. Hence, the wallet extracts from the blockchain reputational information for each of the transactions linked to that master public key and hence to that vendor user.

Having extracted the reputational information, the customer user's wallet can then further process that information. For instance, a reputation calculation algorithm can perform computations on the retrieved reputational information and that can result in an aggregate reputation score for the user(s) and the output will be displayed in the customer user's wallet. For instance, in the case of the reputational information on a single selected user, the wallet can consider the total number of prior reputation transactions recording a positive reputational outcome from a transaction and the total number of prior reputation transactions recording a negative reputational outcome from a transaction. The wallet may indicate the balance of the positives and negatives on the customer user as the credit score. The processing may consider the information against other users not selected and give a relative rating. The processing may take into account the total number of reputation transactions giving rise to the outcome (in case that number is small and hence less robust) and provide a weighting to the score and/or an indication of reliability of the score.

The aggregate reputation score based upon the user through the hash of their master public key may be computed at any time, for instance upon selection, just in time for the presentation of the score with the offer from the user or in advance of any selection or transaction offer by the user to the customer user. The timing may reflect a chosen balance or trade-off between speed and accuracy and/or recentness of the score.

The information flow is shown in FIG. 4. As a result of the performance of transactions by the DFA, the DFA provides through the additional and new reputation transaction the record of the reputational information to the blockchain. When required or requested, the reputational information flows from the blockchain to the wallet of the customer user for processing.

Whilst the implementation of the invention is discussed above in the context of public keys hierarchically derived from a common master public key, the invention can be implemented in the context of wallets other than deterministic wallets. For example, the user has a number of options for facilitating the approach. These include: 1) use the same public key for each transaction, such that this can be used as their master key, but preferably generating a separate address for each transaction (as reusing the same Bitcoin address for multiple transactions is not recommended for security reasons); 2) use a random public key each time (with those being identified with the same 'master key' each time anyway). It is preferable, however, that the user has a hierarchical deterministic wallet because in that wat there is automatically a master key, plus there are the inherent benefits of such wallets such as less for the user to back up).

Use of a DFA in Smart Contracts

This section is provided to give background on how a DFA implements smart contracts.

In this illustrative context, a definition for a DFA that models a process or task, such as a contract, is provided. The DFA interacts with a related system of computing resources which may be referred to as computing agents or "bots". These computing agents are arranged to generate the transactions and submit them to the blockchain. Whilst this DFA embodiment relates to contracts, the use of DFAs is not limited to contracts.

Figure 5:
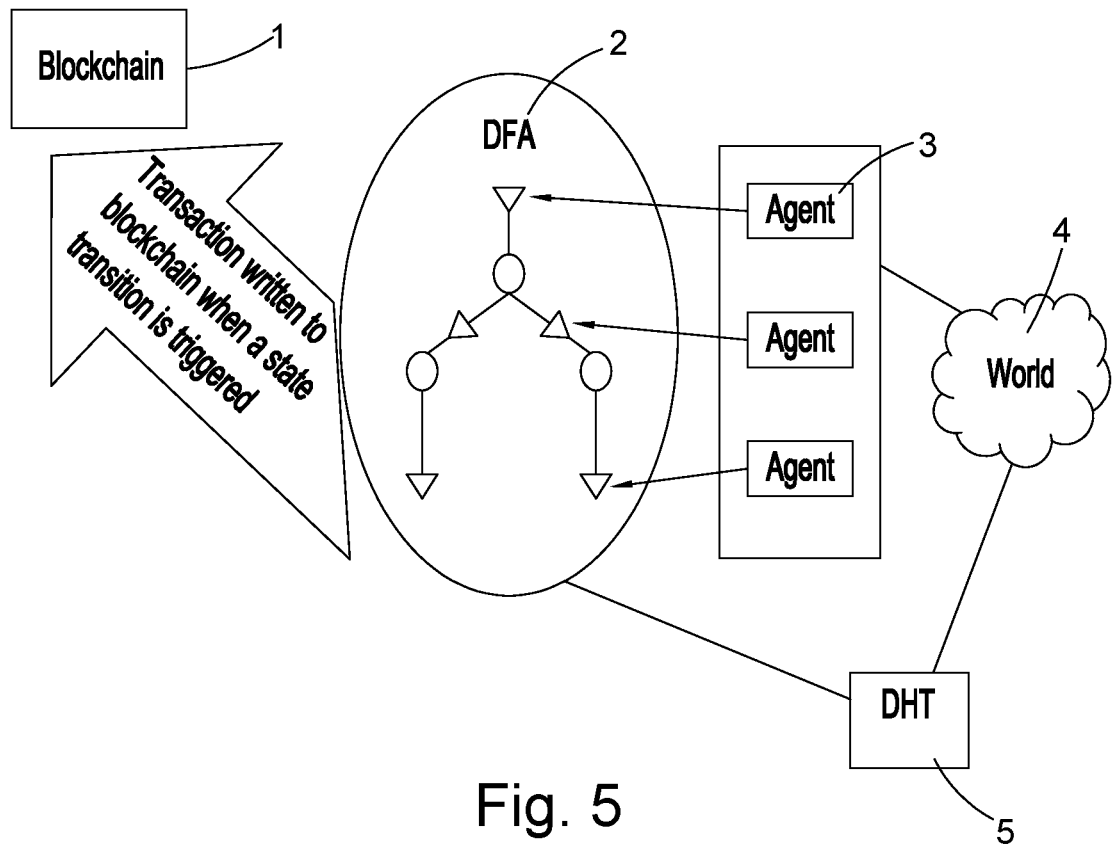
FIG. 5 illustrates an overview of a system into which the invention can be incorporated.

Referring to FIG. 5, the embodiment provides the realisation of a process as an abstract DFA incarnated on a computing platform—blockchain—comprising hardware and software components.

FIG. 5 provides an overview of a system arranged in accordance with an illustrative embodiment of the invention. The system comprises computing agents 3 capable of interaction with other entities of a physical world 4 (e.g. humans or other computers) to receive instructions. These instructions might be, for example, which smart contract to create and execute. Thus, the computing agents 3 interact with the physical world 4 to implement the invention by responding to, and causing, events outside themselves in the "real world".

The specification of the contract itself can be provided in any machine-executable format, e.g. xBRL and stored in a secure and decentralized manner, for example in a distributed hash table (DHT) 5 on the torrent network. From the specification of the contract a computing agent 3 constructs the DFA 2, which is subsequently incarnated on the blockchain 1 by one or more agents.

The DFA 2 itself is specified as a finite set $\{S, I, t, s_0, F\}$, where S stands for the (finite) set of possible states in which the contract/DFA can be; I is a (finite) set of inputs (also known as the alphabet), which in our context means any event or condition which can occur in relation to the contract, e.g., a payment is made, the maturity of the instrument is reached, a counterparty defaults, etc.; in our mechanism these input signals are received/produced by one or more agents, and which then determine the next state of the system (possibly the same one).

The third component of a DFA is a transition function t: S×I→S. The term "deterministic" in "DFA" refers to the uniqueness of the decision: given a state and an input there is only one new state (possibly the same one). Thus, given an initial state ($S_0$) and a history of inputs the outcome of the calculation (contract) is unique, one among the set of all possible final outcomes (F⊆S). Once all these elements have been established, the DFA is completely defined by a transition table, specifying the future states for all possible current states and input signals. The states of the DFA are themselves associated with unspent transaction outputs (UTXO) on the blockchain. As is known in the art, the Bitcoin network continuously tracks all available UTXO. In accordance with the embodiment, the mechanism by which the DFA moves from one state to another is incarnated (implemented) in accordance with the invention by blockchain transactions. Effectively, a transaction on the blockchain spends the UTXO associated with one state (an input of a previous transaction) and creates the UTXO associated with the next state (an output).

Example: Discount (Zero-Coupon) Bond

For the sake of illustration, we now consider a discount (zero-coupon) bond, which is a simple debt instrument usually bought at a price (normally at a discount with respect to its face value), then held for some time until its principal is returned at maturity. The possible states we will consider are S={$s_0$, $f_0$, $f_1$}, indicating, respectively, the holding state ($s_0$), the normal conclusion of the contract (if it follows the happy path) or happy ending ($f_0$), and a state ($f_1$) in which things go wrong, e.g. litigation. The final states of the system are thus F={$f_0$, $f_1$}. The alphabet we will consider is I={r, d, e}, indicating, respectively, repayment of the principal at (or before) expiration (r), default of the issuer at (or before) expiration (d), and expiration of the contract without repayment (e). The transition matrix for this simple contract is presented in Table 1.

TABLE 1 transition table for a DFA representing a zero-coupon bond.

| t | r | d | e |
|---|---|---|---|
| $s_0$ | $f_0$ | $f_1$ | $f_1$ |

It should be noted that the final states represent the completion of the contract, thus no further states need to be specified from them (currently noted as '-' in the transition table, although those lines could be omitted). In principle, more states and/or inputs (as well as actions) could be defined for this instrument, but this has not been done in this document for the sake of simplicity and clarity, to illustrate the fundamentally inventive aspects of the invention rather than injecting distracting detail relating to the complexities of the contract.

Figure 6:
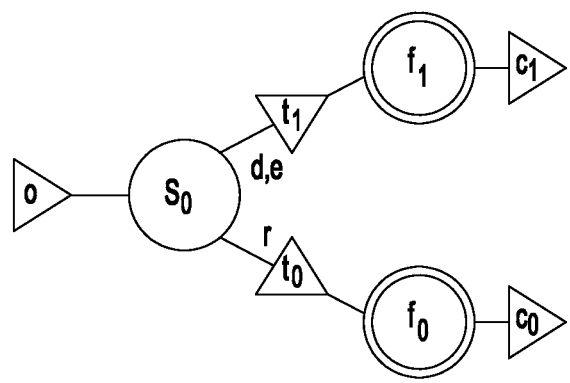
FIG. 6 illustrates a blockchain-based DFA implementation.

FIG. 6 represents the embodiment of the zero-coupon bond DFA on the (Bitcoin) blockchain. The states are represented by circles and the Bitcoin transactions which move the machine from one state to the other by the triangles. Note that the inputs received by the agents are omitted in FIG. 6, however in each state one or other transition should occur according to these inputs, which is reflected in the diagram by the construction of one or other Bitcoin transaction (e.g., $t_0$ or $t_1$ in state $s_0$); no transactions are required for transitions which do not change the state, thus they have been omitted. In addition to the transitional transactions of the DFA ($t_1$), an initial origination transaction (o), and transactions corresponding to the completion of the contract ($c_1$) are considered.

We now turn our attention to the flow of funds in the transactions (originations, transitions and completions). An important observation is that because of the finite nature of the DFA, and of (financial) contracts, the process will be completed after a number of transitions. This necessarily implies (assuming some finite fees for the computing agents involved and the Bitcoin miners) that the maximum costs of the establishment and execution of the contract is bound and can be determined in advance, e.g. at the point of establishment of the DFA. It is given by the total amount of funds required to execute the contract following the longest imaginable path. This, of course, excludes the possibility of infinite loops in the execution, note however that this is not relevant for current (financial) contracts, even contracts such as perpetuities are bound to be completed at some point in the future, despite their name; for example, when the indebted entity ceases to exist or the payments become negligible due to inflation.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of computing aggregated user related data, the method comprising:
   selecting a user for which aggregated user related data is required, to give a selected user;
   generating a filter related to the selected user, wherein the filter collects all reputation transactions, the reputation transactions including metadata relating to a master public key and all descendant public keys therefrom for the selected user, wherein each reputation transaction is implemented by a deterministic finite automaton (DFA), wherein the reputation transaction pays dust to an address controlled by the DFA;
   searching a blockchain for user related data transactions to which the filter applies; and
   computing the aggregated user related data for the selected user from the user related data transactions to which the filter applies.

2. The method according to claim 1, wherein each reputation transaction is a Pay to Script Hash (P2SH) transaction.

3. The method according to claim 2, wherein the Pay to Script Hash (P2SH) transaction is a multi-signature transaction.

4. The method according to claim 1, wherein each reputation transaction may be addressed to an address controlled by a third party.

5. The method according to claim 4, wherein the third party is controlled by the DFA.

6. The method according to claim 1, wherein the DFA is further used for one or more of:
   defining each reputation transaction;
   implementing each reputation transaction;
   providing an expression of a fulfilment; and
   constructing each reputation transaction.

7. The method according to claim 1, wherein the DFA generates user related data for each reputation transaction.

8. The method according to claim 7, wherein the DFA provides that the user related data is published to and stored on the blockchain.

9. The method according to claim 7, wherein the user related data is related to accuracy and/or precision of measurements input to the DFA or used by the DFA or output by the DFA.

10. The method according to claim 1, wherein the DFA is also configured to implement a smart contract.

11. The method according to claim 1, wherein the DFA interacts with a related system of computing resources.

12. The method according to claim 11, wherein the related system of computing resources is arranged to generate transactions and submit the transactions to the blockchain.

* * * * *